(12) United States Patent
Battaglia et al.

(10) Patent No.: US 6,945,161 B1
(45) Date of Patent: Sep. 20, 2005

(54) VERTICAL COOKING RACK

(76) Inventors: John Battaglia, 98 Cardinal La., Westwood, NJ (US) 07675; Jim D'Amato, 20 Berry Pl., Glen Rock, NJ (US) 07452

(*) Notice: Subject to any disclaimer, the term of this patent is extended or adjusted under 35 U.S.C. 154(b) by 0 days.

(21) Appl. No.: 10/709,779

(22) Filed: May 27, 2004

Related U.S. Application Data

(63) Continuation of application No. 10/708,472, filed on Mar. 5, 2004, and a continuation of application No. 10/625,139, filed on Jul. 23, 2003, now Pat. No. 6,827,006.

(51) Int. Cl.[7] .............................................. A47J 43/18
(52) U.S. Cl. ...................... 99/448; 99/426; 211/181.1
(58) Field of Search ................... 99/426, 448, 449, 99/450; 211/181.1, 175, 60.1

(56) References Cited

U.S. PATENT DOCUMENTS

| | | | | |
|---|---|---|---|---|
| 439,569 A | * | 10/1890 | Ahrens | 211/195 |
| 1,514,375 A | * | 11/1924 | Crimmel | 211/74 |
| D161,741 S | * | 1/1951 | Dartt | D6/464 |
| 3,532,225 A | * | 10/1970 | Reed | 211/181.1 |

* cited by examiner

Primary Examiner—Reginald L. Alexander
(74) Attorney, Agent, or Firm—Richard A. Joel, Esq.

(57) ABSTRACT

This invention relates to cooking facilities and particularly to a new, inexpensive and versatile rack for grilling or cooking a variety of meats in a new and improved manner. The unique rack of the present invention comprises a unitary wire structure with a substantially rectangular base wherein the formed wire comprises three sides of the rectangle and a wire cross bar is welded at each end to the formed wire to form the fourth side of the rectangle or square. Members extend upwardly and outwardly to form slots for chicken legs, etc., at a spaced distance above a grill. The wire slots also provide a holder for beer cans and engage a skewer for cooking various meats and vegetables.

11 Claims, 11 Drawing Sheets

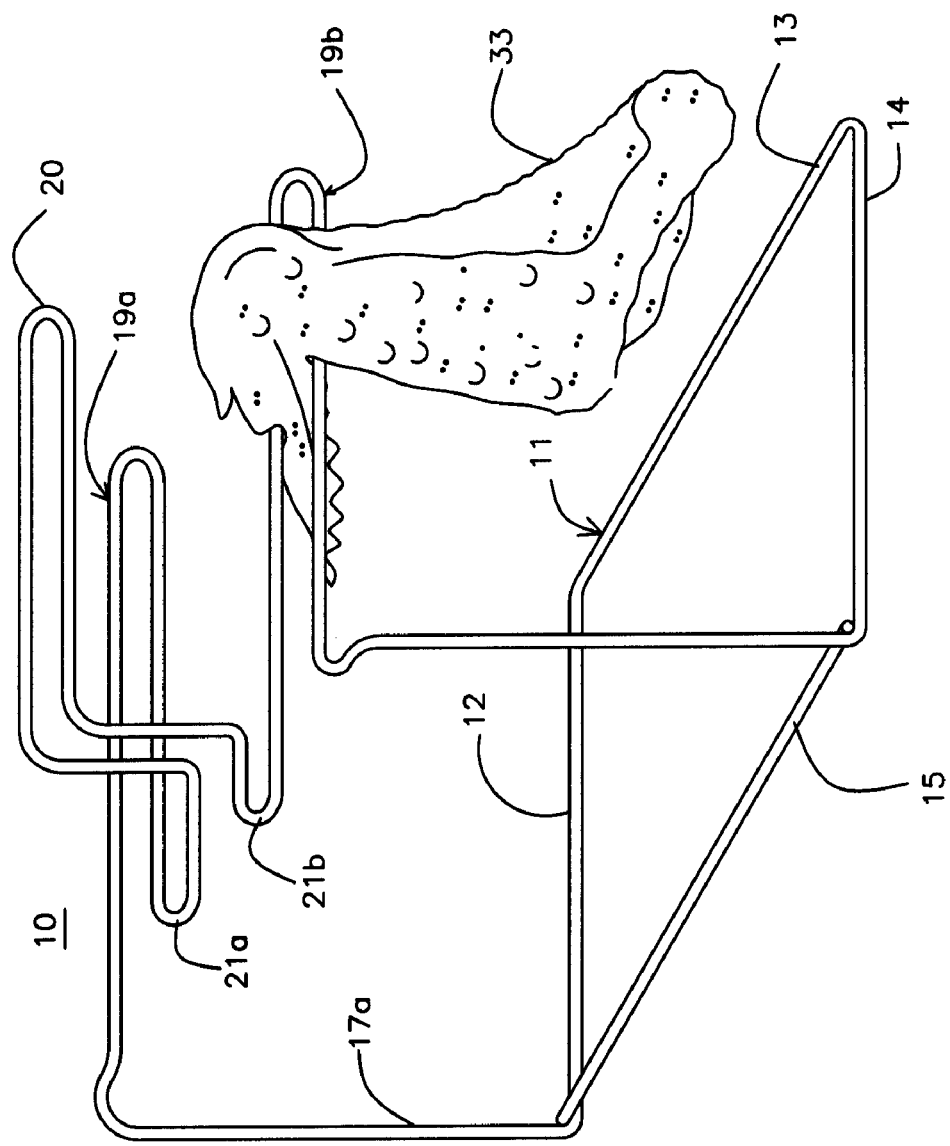

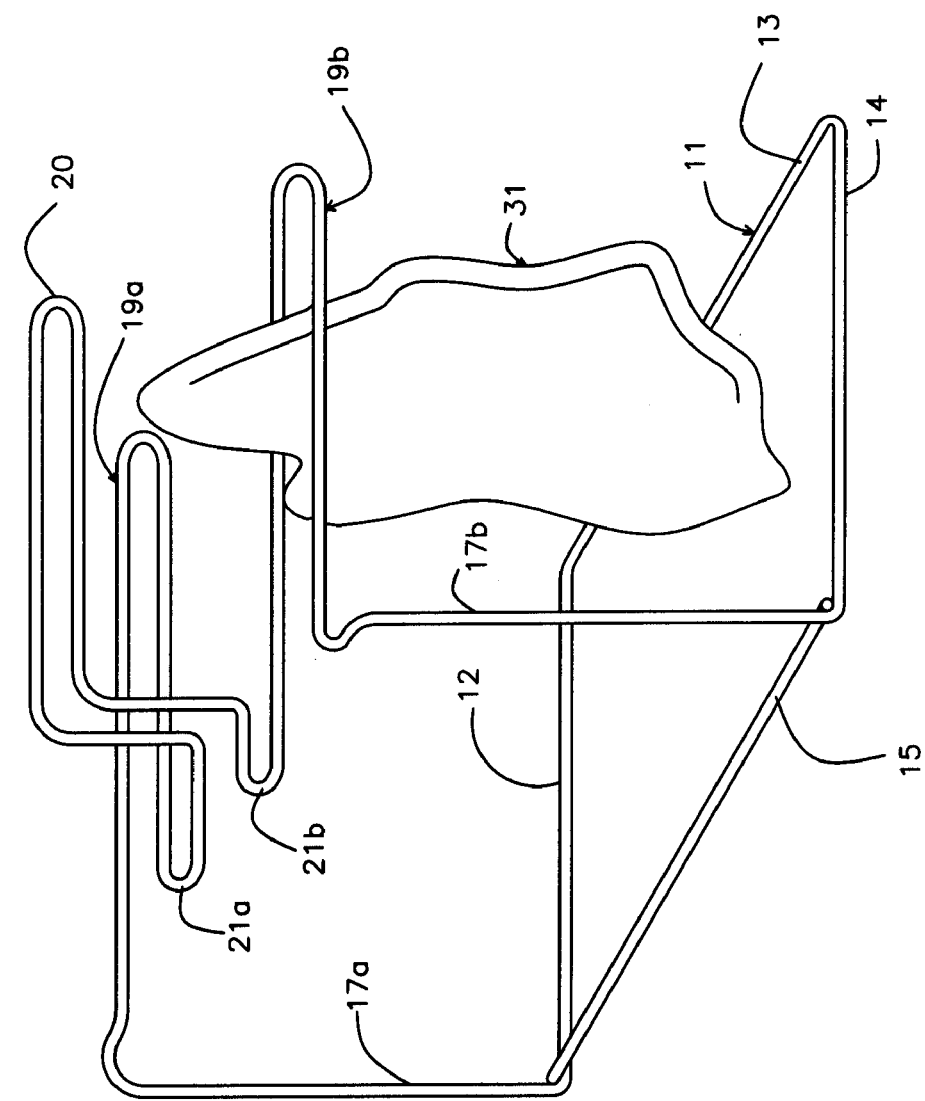

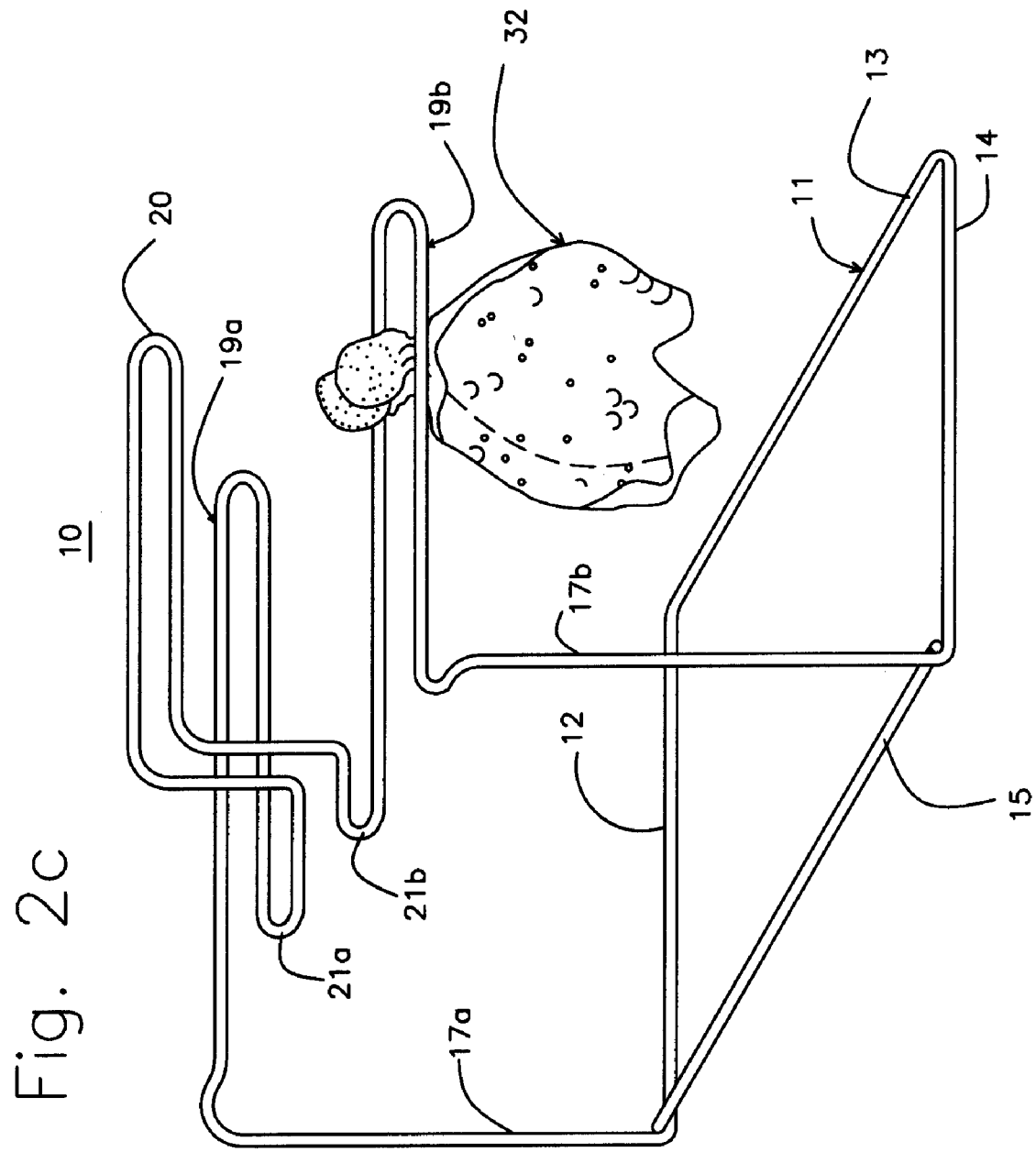

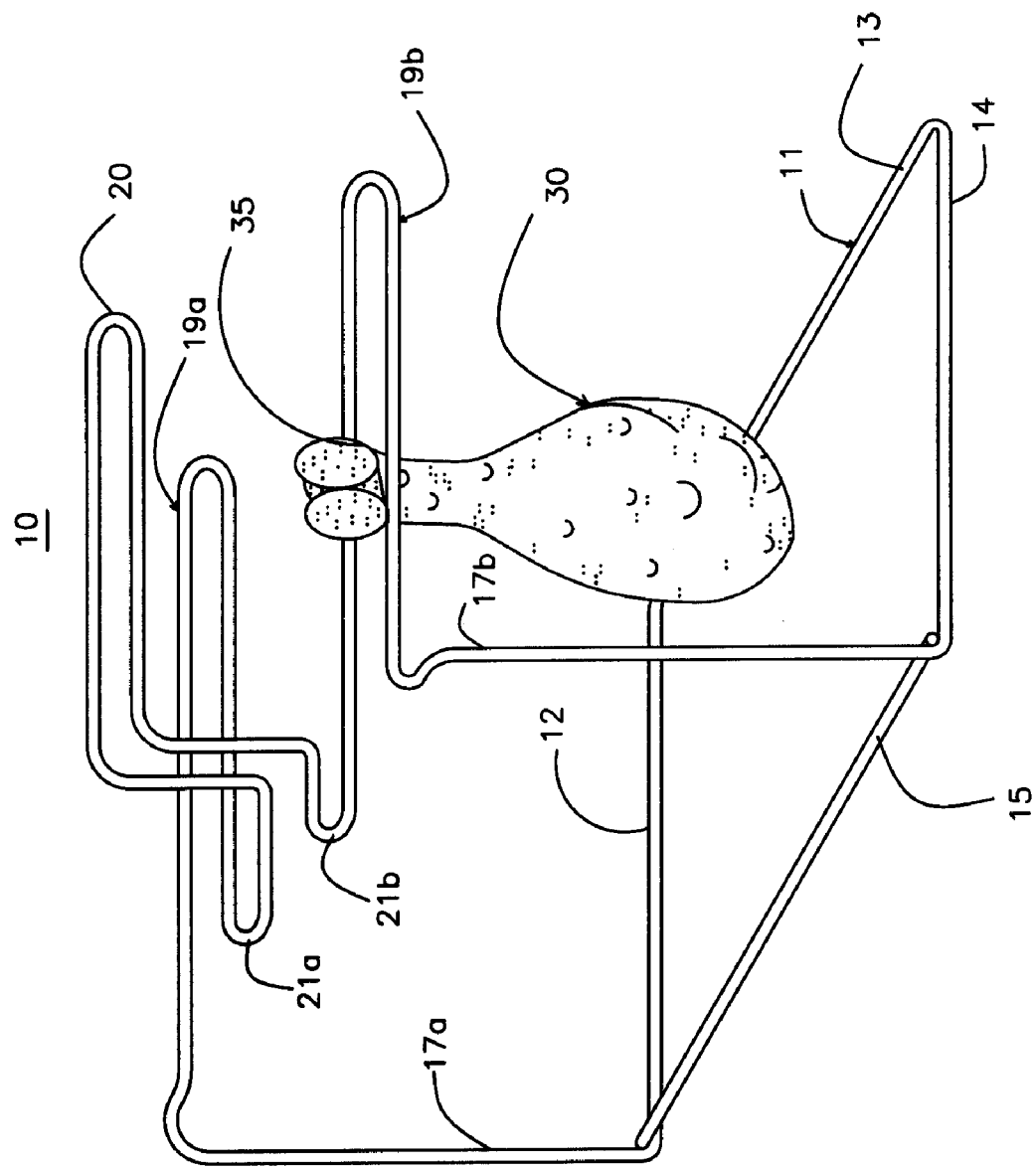

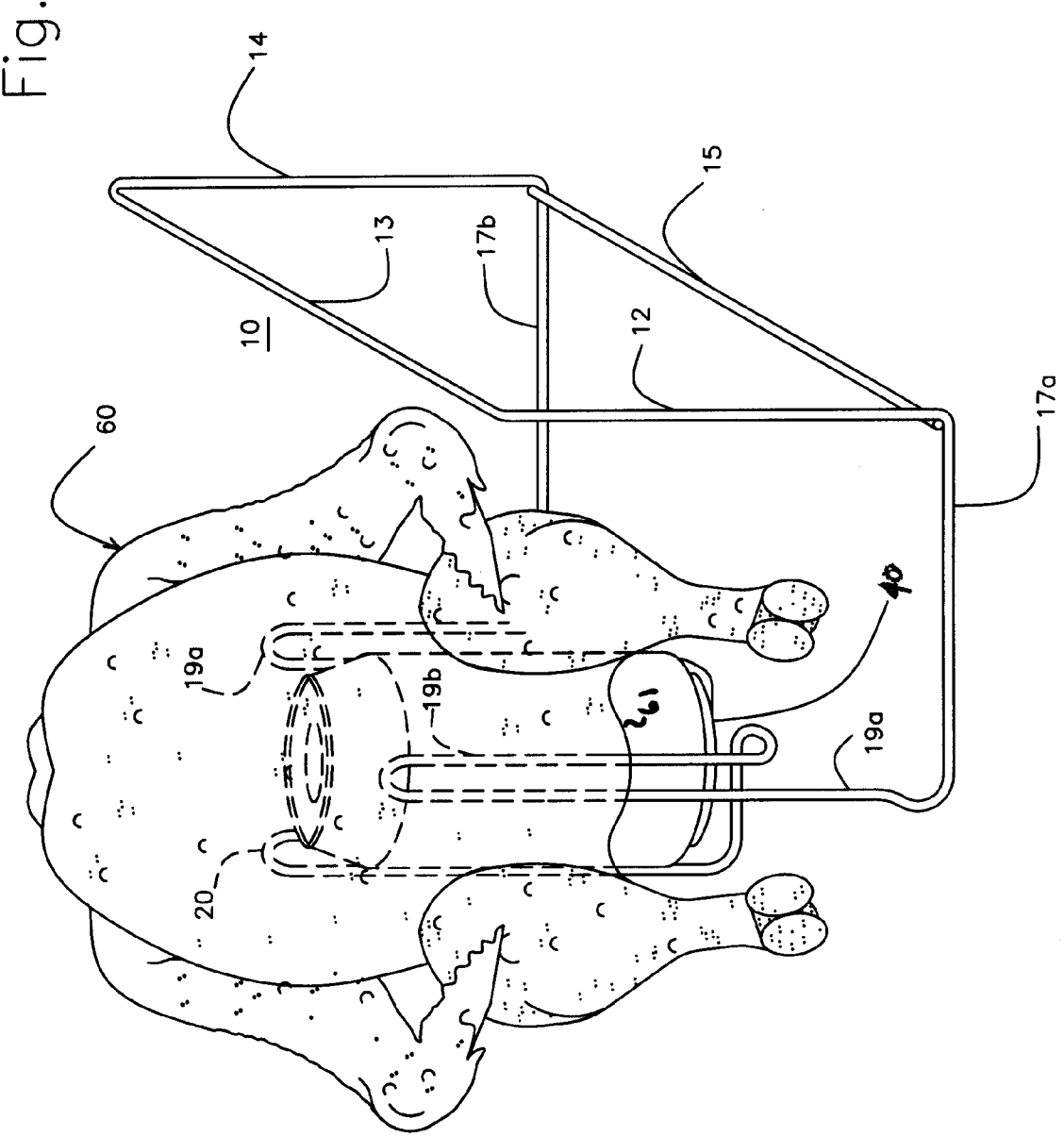

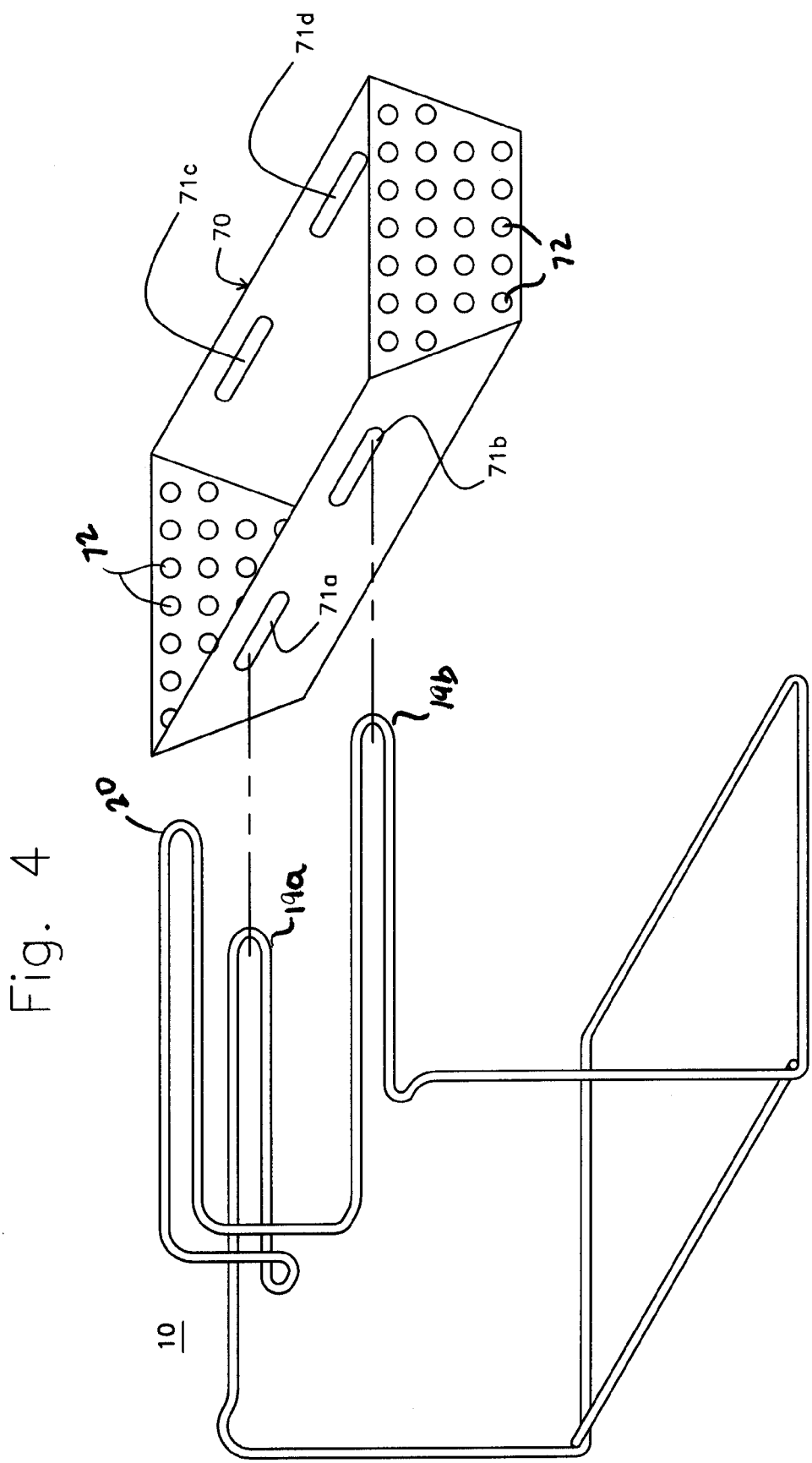

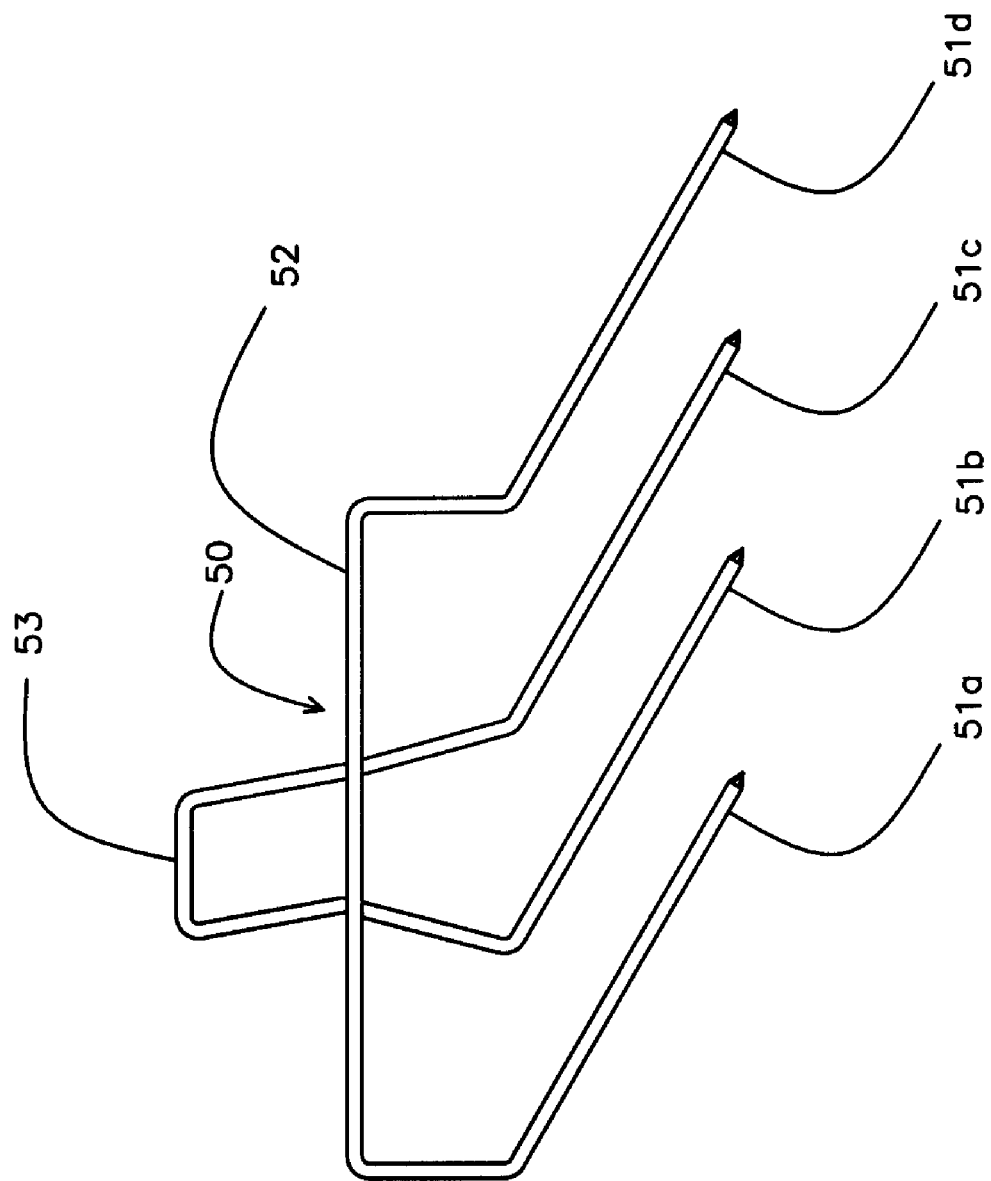

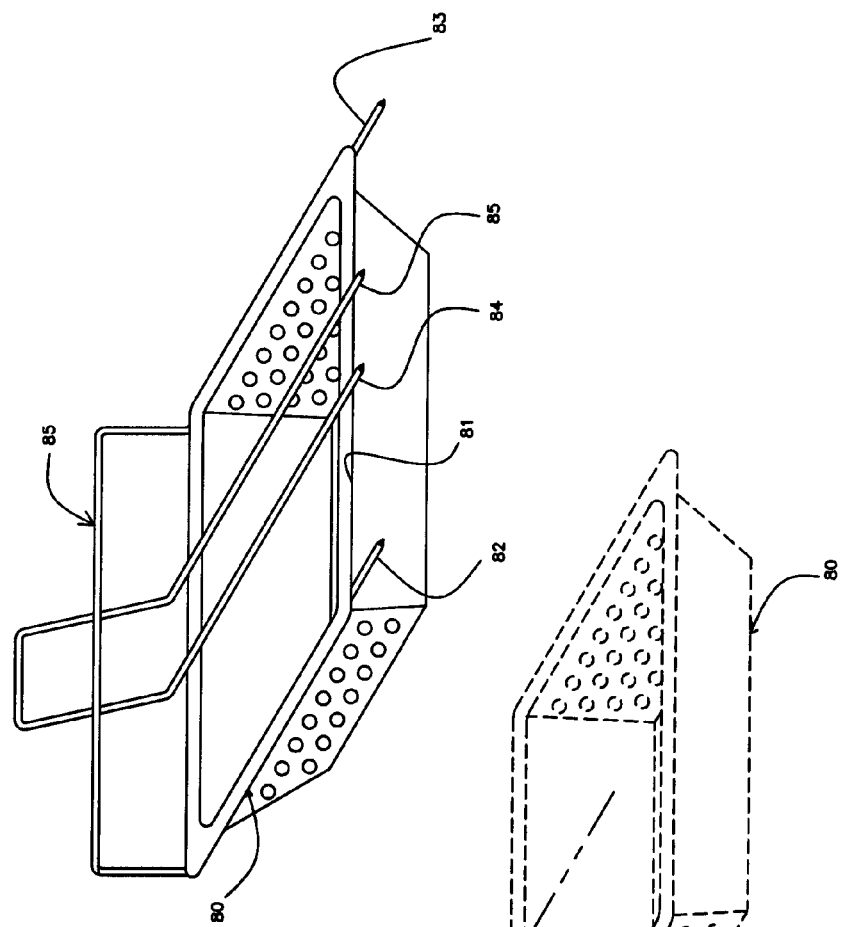
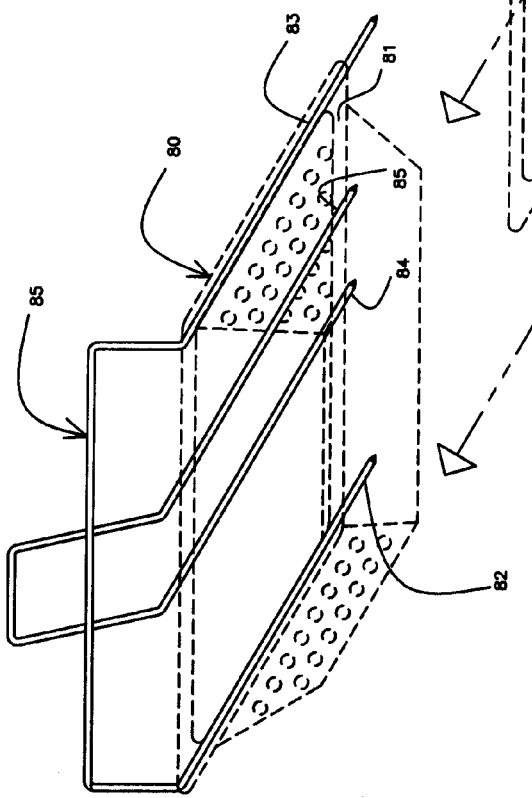
Fig. 6b
Fig. 6a

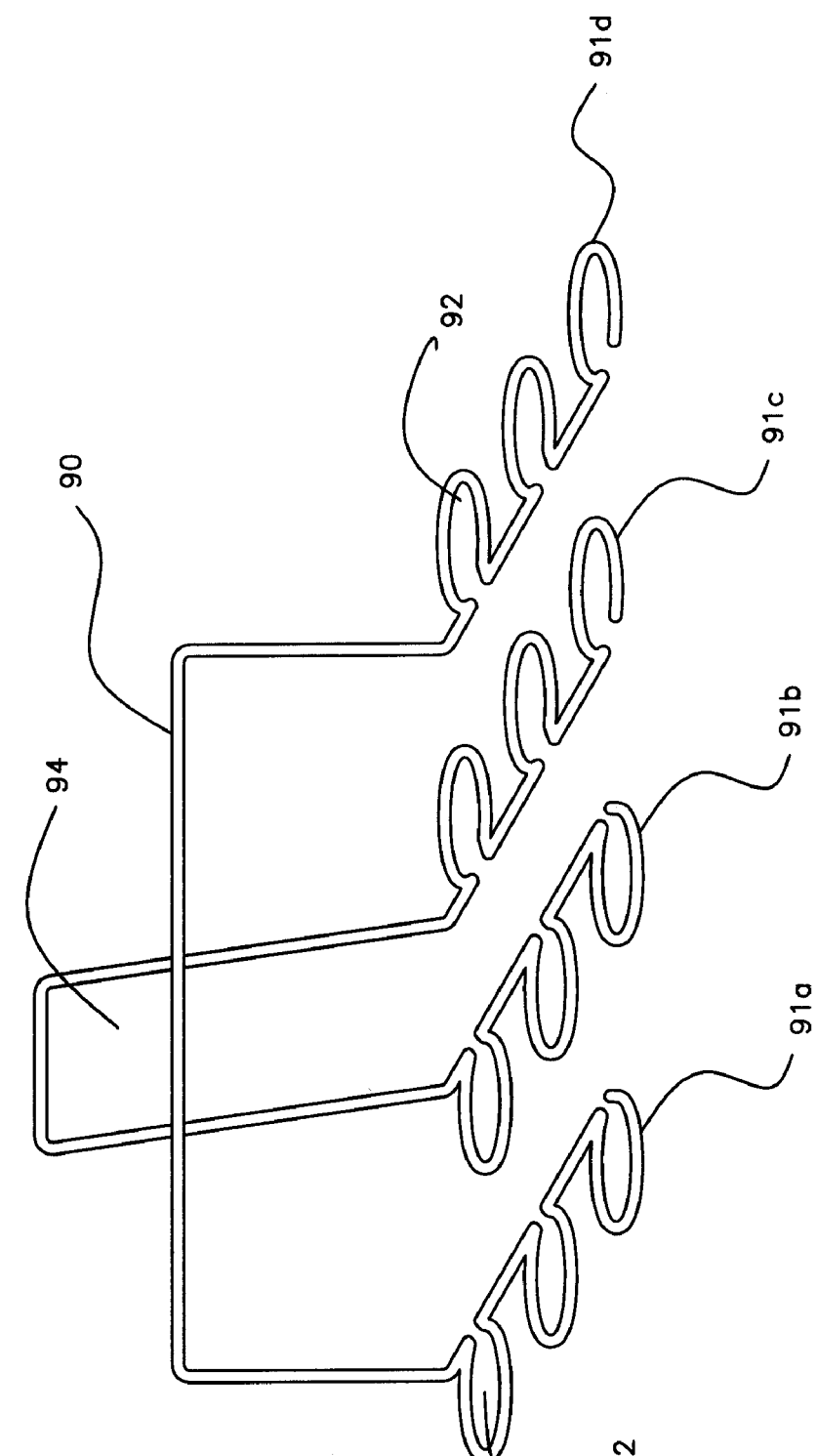

VERTICAL COOKING RACK

CROSS REFERENCE TO RELATED APPLICATIONS

This application is a continuation of application Ser. No. 10/625,139 now U.S. Pat. No. 6,827,006 and 10/708,472 filed Jul. 23, 2003 and Mar. 5, 2004 respectively

BACKGROUND OF INVENTION

This invention relates to cooking facilities and particularly to a new, inexpensive and versatile rack for grilling or cooking a variety of meats, poultry and vegetables in a new and improved manner.

In barbecuing chicken legs, it is extremely difficult to cook the legs uniformly without burning. The legs must be constantly watched and rotated on the grill. Unfortunately, even with considerable attention, it is quite easy to burn the legs or cook the legs in a non-uniform manner. The present invention is designed to permit uniform cooking of a plurality of chicken legs without the problems associated with the prior art method. The invention comprises a unique rack, which holds the legs in a vertical position spaced at a predetermined distance above the fire for uniform cooking without the problem of burning. The versatile rack may also be used to cook other chicken parts and meats. Further, the rack may be placed on its side to cook beer can chicken with the can held by the slot wires and a cavity in the chicken placed over the beer can.

In the prior art, U.S. Pat. No. 2,269,310 discloses a display device for supporting and displaying axe and shovel handles. The device includes a plurality of spaced parallel slots with openings at one end. The device is for a use different from the present invention and apart from apparent similarity of parallel slots, is different in structure.

U.S. Pat. No. 5,730,046 to Battaglia, et al discloses a rack for grilling chicken legs in a barbecue comprising a flat elongated rack surface including a plurality of slots to hold chicken legs in a vertical position at a predetermined distance above the grill. The slots are sized to support chicken legs by engaging the leg joint with the meaty leg portion extending vertically below the flat rack surface. Applicant's invention is an improvement on this design.

U.S. Pat. No. 4,559,869 is directed to an adjustable barbecue rack for supporting a plurality of spareribs. The device includes a plurality of racks removably secured to a main rack. Another version of a barbecue rack is shown in U.S. Pat. No. 4,458,585 wherein a cooking surface is defined by spaced rods formed in a particular manner.

One of the popular ways to cook chicken in various regions of the United States is to cook the chicken with a beer can inserted into a chicken cavity. The beer can is usually about one-half full and contains seasoning in addition to beer. The beer can is generally mounted on a holder and the whole chicken is mounted thereover. The moist seasoned steam permeates the chicken creating a uniquely flavorful chicken.

U.S. Pat. No. 6,503,551 to Hester discloses a method for roasting fowl wherein a wire frame supports a beverage can in an upright position. The beverage can is inserted into the cavity of a fowl that has been cleaned and seasoned. The wire structure of Hester is very dissimilar from applicants' design and is limited in application and versatility. The same applies to Hester's parent application now U.S. Pat. No. 6,460,452, which shows the same structure as divisional U.S. Pat. No. 6,503,551.

U.S. Pat. No. 6,192,792 to Gremillion discloses an integrated poultry and meat cooking apparatus having a collecting pan and a vertical steaming tube upon which meat or poultry is supported in an upright position during cooking.

Also of interest is applicants' U.S. patent application Ser. No. 10/708,472 filed Mar. 5, 2004.

Other patents of general interest include U.S. Pat. Nos. 4,677,906; 4,583,647; 4,765,584; 4,184,592; and, 4,542,684. None of the prior art patents mentioned above affect the patentability of the present invention which relates to a unique, efficient and inexpensive rack for cooking a wide variety of meats and poultry.

SUMMARY OF INVENTION

This invention relates to cooking devices and particularly to a versatile rack for cooking a variety of poultry and meats in a vertical position above a grill. The cooking rack of the present invention may be used to cook chicken wings, thighs, and legs in a vertical position to prevent burning and promote even cooking. Hot dogs and sausages may also be cooked on the rack. Beer can whole chicken can be cooked by tilting the rack and inserting a beer can with seasoned beer into a formed holder and then positioning a chicken thereover with the can within a cavity in the chicken. Utilizing the rack with skewers, shish-ka-bobs, chicken breasts, steaks, ribs, buffalo wing/wingettes, vegetables and chili roaster may be cooked on the formed rack of this invention.

The unique rack of the present invention comprises a unitary wire structure with a substantially rectangular base wherein the formed wire comprises three sides of the rectangle and a wire cross bar is welded at each end to the formed wire to form the fourth side of the rectangle or square. Generally, only a single weld is required after forming apart from the crossbar. Members extend upwardly a predetermined distance from the wire crossbar at the base corners. The upwardly extending members then turn downwardly at their curved upper ends for a set distance. The wires at each end extend outwardly and then inwardly for a predetermined distance forming a loop or slot for chicken legs, etc. The wires then extend vertically forming a slot for vertical cooking. The three wire slots also provide a holder for beer cans with the can positioned to be engaged by the slot wires.

Thus the wire rack can be used either in a vertical position to cook chicken legs, wings and thighs, etc. and flipped over to insert a beer can and cook beer can whole chicken. The wire rack in its original position can cook sausages or hot dogs; and can be used with skewers to cook a variety of meats and poultry.

Accordingly, an object of this invention is to provide a new and improved cooking rack.

Another object of this invention is to provide a new and improved versatile cooking rack that may be used in various positions on a grill or oven to cook different meats.

A further object of this invention is to provide a new and improved unitary wire cooking rack with spaced slots for cooking chicken legs and the like and a central slot can be used as a handle.

A still further object of this invention is to provide a new and improved cooking rack with interconnected skewers to permit cooking a variety of poultry, meats and vegetables.

A more specific object of this invention is to provide a new and improved inexpensive cooking rack wherein a beer can may be secured between the projecting slots with the rack on its side to accommodate a whole chicken and the rack may be tilted to do vertical cooking on various meat and poultry.

BRIEF DESCRIPTION OF DRAWINGS

The above and other objects of this invention may be more clearly seen when viewed in conjunction with the accompanying drawings wherein.

FIG. 2a is a perspective view of the rack with a chicken wing; FIG. 2b is a perspective view with a chicken breast and FIG. 2c is a perspective view with a chicken thigh and FIG. 2d is a perspective view with a chicken leg.

FIG. 4 is a perspective view of the invention with a shaker basket.

FIG. 5 shows a perspective view of the unique skewer.

FIGS. 6a and 6b show the installation of a basket on a skewer and final assembly; and.

FIG. 7 shows a chili roaster attachment for the rack.

DETAILED DESCRIPTION

Figure 1A:
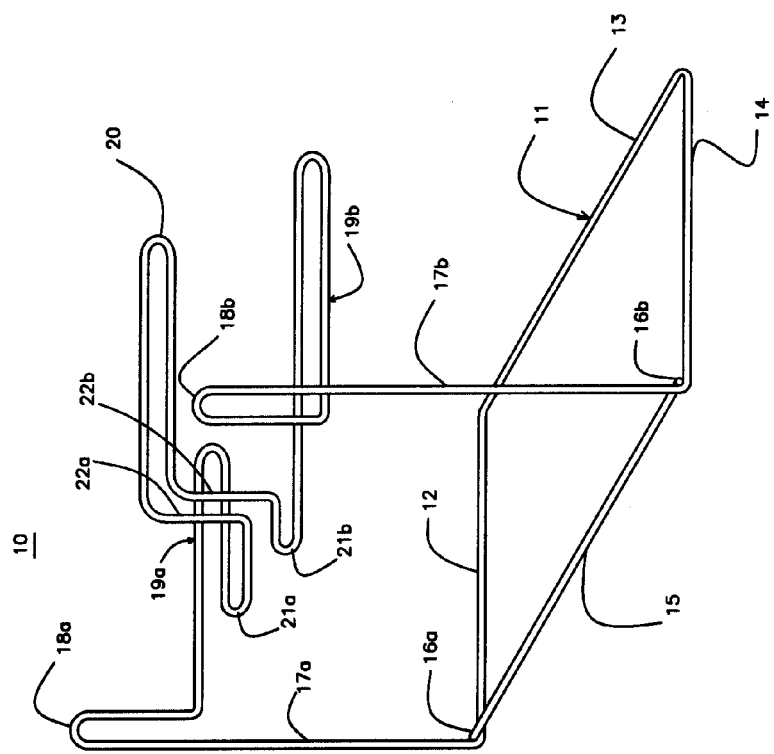
FIG. 1a is a perspective view of the cooking rack device and FIG. 1b is a perspective view of the rack on its side to cook beer can chicken.
Figure 1B:
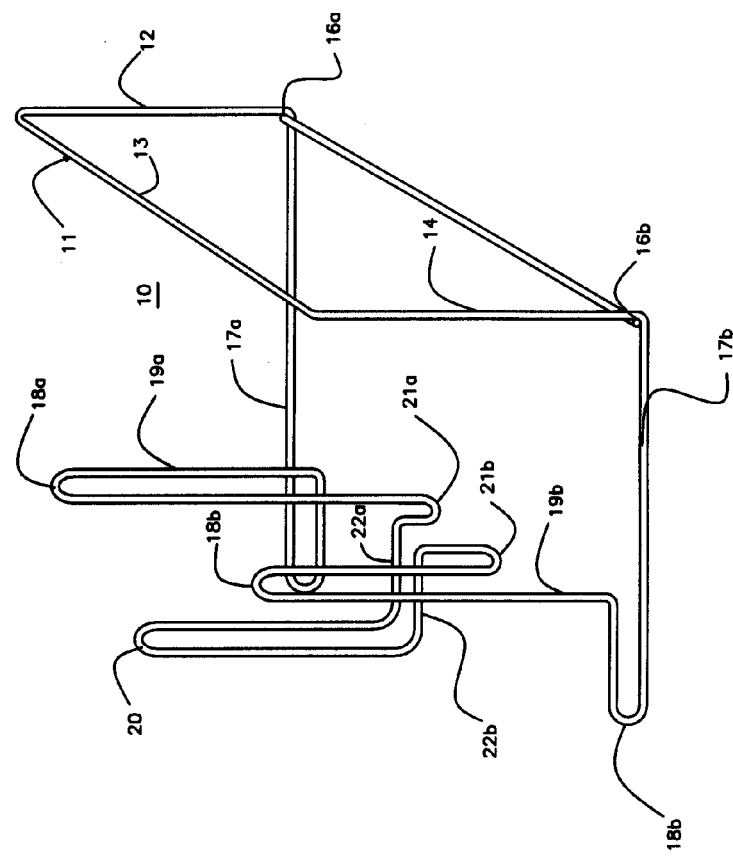

Referring to FIGS. 1a and 1b of the drawings, the invention comprises a versatile cooking rack 10 for cooking a variety of poultry and and meat cuts usually on a grill. The unique rack 10 comprises a unitary wire structure with a substantially rectangular base 11 wherein a formed wire comprises three sides 12, 13 and 14 of the base 11 and a wire cross member 15 is welded at each end 16a, 16b to form the fourth side of the rectangle.

A formed wire portion 17a, 17b extends upwardly a predetermined distance from the wire cross bar 15 at the corners 16a, 16b. The upwardly extending wire portions then turn downwardly at their curved upper ends 18a, 18b for a short distance. The wires then turn outwardly at each end forming loops 19a and 19b. The loops 19a and 19b continue inwardly forming loops or slots 21a and 21b in approximately the same plane as cross-bar 15 but at a spaced distance therefrom. Wire portions 22a, 22b extend upwardly form loops 21a, 21b and then outwardly forming loop 20 which may be used as a handle.

The slots 19a, 21a, 20, 21b, and 19b may be used to hold chicken legs 30 above a grill to uniformly grill said legs without burning. The legs 30 are held in place upside down by the leg bone 35 which is positioned above the slot as the leg is slid into position, (see FIG. 2d). Chicken wings and thighs can also be mounted on the rack for grilling. (see FIGS. 2a and 2c). Also sausages and may be cooked on the rack. The rack 10 can also be used with skewers 50, shown in FIG. 5, which mount to the rack 10 and are used to cook a variety of meats and poultry.

As shown more specifically in FIGS. 1b and 3, the rack 10 may be placed on its side with the base 11 and loops 19a, 20 and 19b extending upwardly. This is called the beer can position. A beer can 40 which is generally half filled with beer and spices is positioned on wire portions 22a and 22b and supported by loops 19a, 19b. Of course any twelve ounce can filled with seasoned liquid can be used.

Figure 3B:
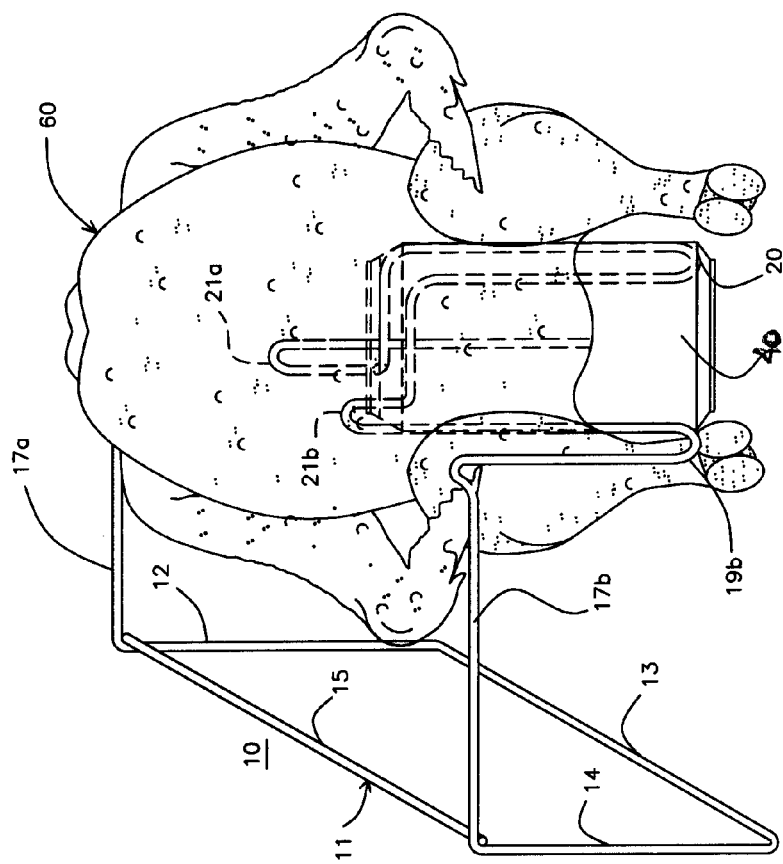
FIG. 3b is a perspective view of the rack turned in the direction of the rack of FIG. 3c to cook beer can chicken.
Figure 3C:
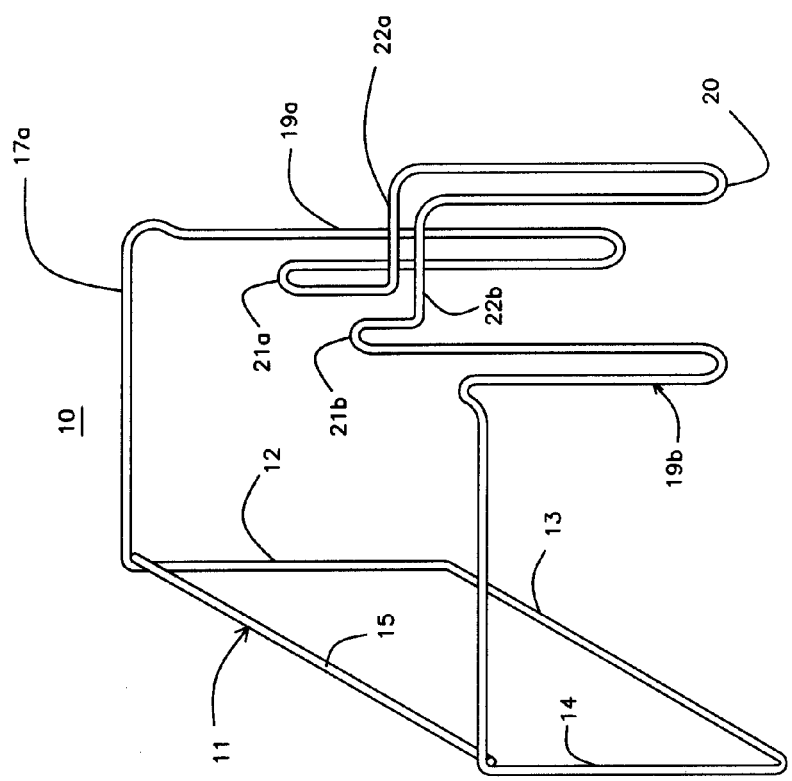
FIG. 3a is a perspective view wherein the rack is flipped 90° to cook beer can chicken.

FIG. 3a shows a beer can 40 on the rack 10 of FIG. 1b. The chicken 60 is inserted over the beer can 40 with the can 40 engaging cavity 61. The seasoning from the beer permeates the chicken 60 during cooking to add unique flavors. FIGS. 3b–c shows the rack 10 in a different position on the grill with wire 13 and loops 19a, 19b and loop 20 supporting the rack 10. The chicken 60 is then positioned with slots 21a and b extending upwardly within the chicken 60 with the beer can 40.

The versatility of the invention is seen by FIG. 2d which shows a chicken leg 30 held by the rack 10, FIG. 2b which shows a chicken breast 31, FIG. 2c which shows a chicken thigh 32 and FIG. 2a which shows a chicken wings 33. FIG. 4 shows a shaker basket 70 with apertures 71a–d which engage loops 19a and 19b. Loop 20 is positioned above the basket 70 to secure the basket 70 in position. The basket 70 adds further versatility to the rack 10 in cooking and is used for cooking vegetables, shrimp and fish. The basket 70 includes a plurality of apertures 72 in one or more faces of the basket 70.

FIG. 5 shows the skewer 50 which includes four outwardly extending prongs 51a–51d joined by wire portion 52. The prongs 51a–d extend upwardly at an angle to portion 52. The prongs 51b and 51c are an integral unit and extend beyond portion 52 where they are spot-welded. The prongs 51b, 51c are joined together by portions 53 to provide a coupling to fit over loop or handle 20 on the rack 10. With the skewer 60, it is possible to conveniently cook a wide variety of meats on a grill.

FIGS. 6a, 6b show a basket 80 having a circumferential lip 81 that is supported by outer prongs 82 and 83 on the skewer 85. The interior prongs 84 and 85 engage the top of the basket 80 to hold it securely in place. The basket 80 is shown in phantom in FIG. 6a being moved into engagement with the skewer 85. FIG. 6B shows the basket 80 in engagement with the skewer 85.

FIG. 7 shows a chili rack roaster 90 wherein prongs 91a–d include a plurality of substantially circular openings 92 formed along prongs 91a and 91b in one direction and along prongs 91c and 91d facing in the opposite direction. Chili peppers may be inserted in the openings 92 and the roaster 90 installed on the rack 10 by placing the aperture 94 over the handle 20 on the rack 10. The roaster 90 may be formed from flat sheet metal by stamping, etc. The rack 10 may be then be placed on a barbeque.

In summary, the unique structure of rack 10, permits improved cooking of a wide variety of meats and poultry. The versatile rack 10 is inexpensive to make, comprising only of a single formed wire and a spot-welded cross-member with a detachable skewer 50 or 90. Racks 10 can also be readily stacked for storage and shipping. An aluminum foil cover/shell positioned on top of the rack 10 creates a turbo cooking effect wherein heat is entrapped and circulated over the food below to cut cooking time.

While the invention has been explained by a detailed description of certain specific embodiments, it is understood that various modifications and substitutions can be made in any of them within the scope of the appended claims that are intended also to include equivalents of such embodiments.

What is claimed is:

1. A cooking rack for products such as poultry and meats comprising:
   a single formed wire having a base and a plurality of product holding wire slots spaced from said base and a single raised central wire slot to be used as a handle;
   an elongated wire cross-member welded to the base for support said base comprising a rectangle having three sides of the formed wire and the fourth side comprising the elongated cross-member; and, wherein the formed wire rack may be positioned on its side to perform additional cooking operations the base extending vertically upward and said rack being supported by the wire forming the slots.

2. A cooking rack in accordance with claim 1 further including:
a wine skewer having a cross-member and a plurality of spaced prongs extending outwardly from the cross-member and a loop portion extending upwardly from the cross-member to engage the handle portion of the wire rack.

3. A cooking rack in accordance with claim 1 wherein:
the slot wire and handle slot wire are positioned to engage and support a cylindrical can therebetween.

4. A cooking rack for products such as poultry and meats comprising:
a single formed wire comprising a base having a parallel side portions joined by a transverse portion at one end, a portion extending upwardly at the other end of each side portion, said portion curving downwardly a predetermined distance and then outwardly and inwardly forming, a slot, said wire then curving outwardly for a short distance to a point where the wire extends upwardly at a right angle for a predetermined distance and then outwardly to join both wire portions forming a handle slot; and,
a cross-member mounted parallel to the transverse portion and affixed to the parallel sides or the base.

5. A cooking rack in accordance with claim 4 wherein:
a wire skewer having a cross-member and a plurality of spaced prongs extending outwardly from the cross-member and a loop portion extending upwardly from the cross-member to engage the handle slot.

6. A cooking rack in accordance with claim 5 further including:
a shaker basket having a base, four sides extending upwardly from the base to a point and a lip located at that point having a top and bottom and extending circumferentially about the basket, wherein:
the basket is supported by skewer prongs that engage the bottom of the basket lips on opposite sides and the top of the lips is engaged by skewer prongs to provide a firm support for the basket.

7. A cooking rack in accordance with claim 6 wherein:
the sides slop outwardly from the base and include a plurality of apertures.

8. A cooking rack in accordance with claim 4 further including:
an aluminum foil cover mounted on top of the rack to create an accelerated cooking effect to reduce time.

9. A cooking rack for products such as poultry and meats comprising:
a single formed wire having a base and a plurality of product holding wire slots spaced from said base and a raised central wire slot to be used as a handle;
an elongated wire cross-member welded to the base for support, wherein the formed wire rack may be positioned on its side to perform additional cooking operations; and,
said rack further including a wire skewer having a cross-member and a plurality of spaced prongs extending outwardly from the cross-member and a loop portion extending upwardly from the cross-member to engage the handle portion of the wire rack.

10. A cooking rack in accordance with claim 9 further including:
a shaker basket comprising a substantially rectangular base; a first pair of upwardly extending opposite sides each leaving a pair of apertures, said apertures being in alignment to engage respective wire rack slots and a second pair of upwardly extending opposite sides joining the respective ends of the first pair of sides.

11. A cooking rack in accordance with claim 10 wherein:
the first pair of sides are sloped outwardly from the base and the second pair of sides and the base include a plurality of apertures.

* * * * *